United States Patent
Bui

(10) Patent No.: US 11,022,163 B2
(45) Date of Patent: Jun. 1, 2021

(54) ARRANGEMENT OF A FIRST AND A SECOND COMPONENT

(71) Applicant: Bayerische Motoren Werke Aktiengesellschaft, Munich (DE)

(72) Inventor: Hoang Viet Bui, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 656 days.

(21) Appl. No.: 15/669,052

(22) Filed: Aug. 4, 2017

(65) Prior Publication Data

US 2017/0328396 A1    Nov. 16, 2017

Related U.S. Application Data

(63) Continuation of application No. PCT/EP2016/050757, filed on Jan. 15, 2016.

(30) Foreign Application Priority Data

Feb. 5, 2015  (DE) .................... 10 2015 202 036.3

(51) Int. Cl.
*F16B 31/04* (2006.01)
*F16B 5/02* (2006.01)
(Continued)

(52) U.S. Cl.
CPC .............. *F16B 31/04* (2013.01); *F16B 5/02* (2013.01); *F16B 5/065* (2013.01); *F16B 33/008* (2013.01); *Y10T 403/75* (2015.01)

(58) Field of Classification Search
CPC ........ F16B 2/005; F16B 5/02; F16B 5/0241; F16B 5/025; F16B 31/04; F16B 33/008;
(Continued)

(56) References Cited

U.S. PATENT DOCUMENTS 2,914,149 A * 11/1959 Walker .................... F16B 5/02
                                                                52/394
2,934,182 A *  4/1960 Neville .................... F16B 5/02
                                                               403/408.1
(Continued)

FOREIGN PATENT DOCUMENTS

DE           31 09 566 A1   10/1982
DE     10 2004 035 540 A1    2/2006
(Continued)

OTHER PUBLICATIONS

International Search Report (PCT/ISA/210) issued in PCT Application No. PCT/EP2016/050757 dated Apr. 19, 2016 with English translation (Four (4) pages).
(Continued)

*Primary Examiner* — Josh Skroupa
(74) *Attorney, Agent, or Firm* — Crowell & Moring LLP

(57) ABSTRACT

An arrangement of a first component and a second component, wherein at least the first or the second component is a fiber-reinforced plastic composite component. The first and second components are connected to each other so as to generate a clamping connection between the components via an expansion bolt which generates a clamping force creating the clamping connection and equalizes a creep behavior of the fiber-reinforced plastic composite component.

11 Claims, 2 Drawing Sheets

(51) Int. Cl.
  *F16B 5/06* (2006.01)
  *F16B 33/00* (2006.01)
(58) Field of Classification Search
  CPC .. F16B 2200/50; F16B 5/065; Y10T 403/335;
           Y10T 403/645; Y10T 403/75
  USPC ..................................... 403/168, 337, 408.1
  See application file for complete search history.

(56) References Cited

U.S. PATENT DOCUMENTS

| | | | | |
|---|---|---|---|---|
| 2,936,050 | A * | 5/1960 | McLaughlin | F16B 5/02 52/704 |
| 6,164,684 | A * | 12/2000 | Lehman | B60R 21/217 403/408.1 |
| 6,171,009 | B1 | 1/2001 | Wright | |
| 6,523,834 | B2 * | 2/2003 | Philipson | C09K 3/1021 277/523 |
| 6,626,603 | B2 * | 9/2003 | Gudaitis | F16B 5/0241 29/458 |
| 8,492,004 | B2 * | 7/2013 | Watanabe | F16B 5/02 428/212 |
| 9,291,202 | B2 * | 3/2016 | von Schleinitz | F16B 2/005 |
| 9,604,676 | B2 * | 3/2017 | Kelley | F16B 5/02 |
| 9,689,418 | B2 * | 6/2017 | Schumacher | F16B 31/02 |
| 10,094,405 | B2 * | 10/2018 | Nonaka | B29C 65/562 |
| 2003/0021628 | A1 | 1/2003 | Gudaitis et al. | |
| 2014/0003880 | A1 | 1/2014 | Grooms, II | |
| 2016/0040703 | A1 * | 2/2016 | Schnaufer | F16B 5/02 411/34 |

FOREIGN PATENT DOCUMENTS

| | | | | |
|---|---|---|---|---|
| DE | 102010024534 A1 * | 12/2011 | ........... | E04B 1/2403 |
| DE | 102011107237 A1 * | 5/2012 | ............ | F16B 5/0642 |
| DE | 102012109047 B3 * | 2/2014 | ............ | F16B 5/0241 |
| DE | 10 2013 005 881 A1 | 10/2014 | | |
| DE | 10 2013 210 905 A1 | 12/2014 | | |
| DE | 10 2014 007 793 A1 | 12/2014 | | |
| JP | 2013-126316 A | 6/2013 | | |
| JP | 5417188 B2 | 2/2014 | | |

OTHER PUBLICATIONS

German-language Written Opinion (PCT/ISA/237) issued in PCT Application No. PCT/EP2016/050757 dated Apr. 19, 2016 (Five (5) pages).

German-language Search Report issued in counterpart German Application No. 10 2012 202 036.3 dated Jan. 21, 2016 with partial English translation (Eleven (11) pages).

Chinese-language Office Action issued in counterpart Chinese Application No. 201680003363.8 dated Jul. 16, 2018 with English translation (13 pages).

* cited by examiner

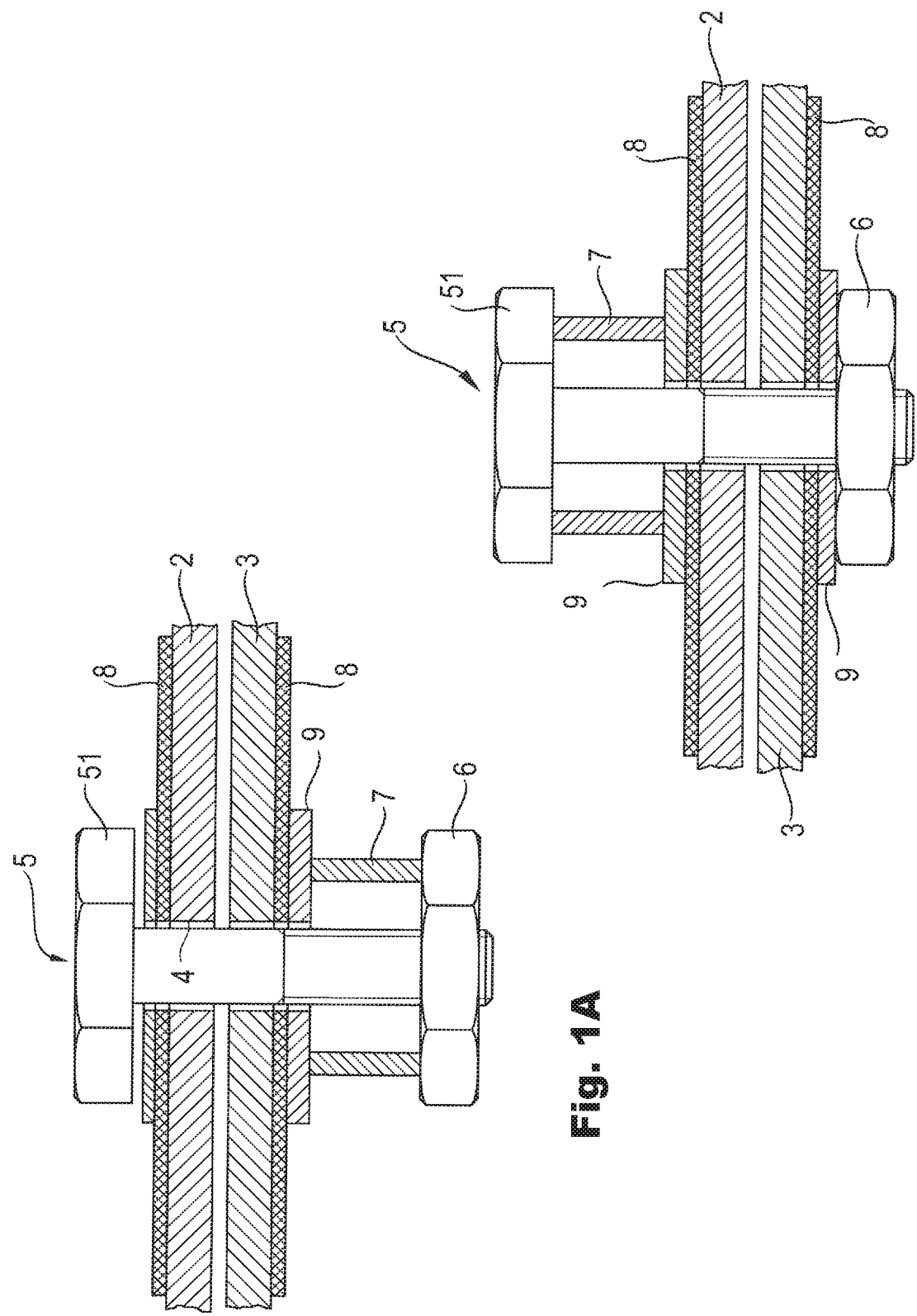

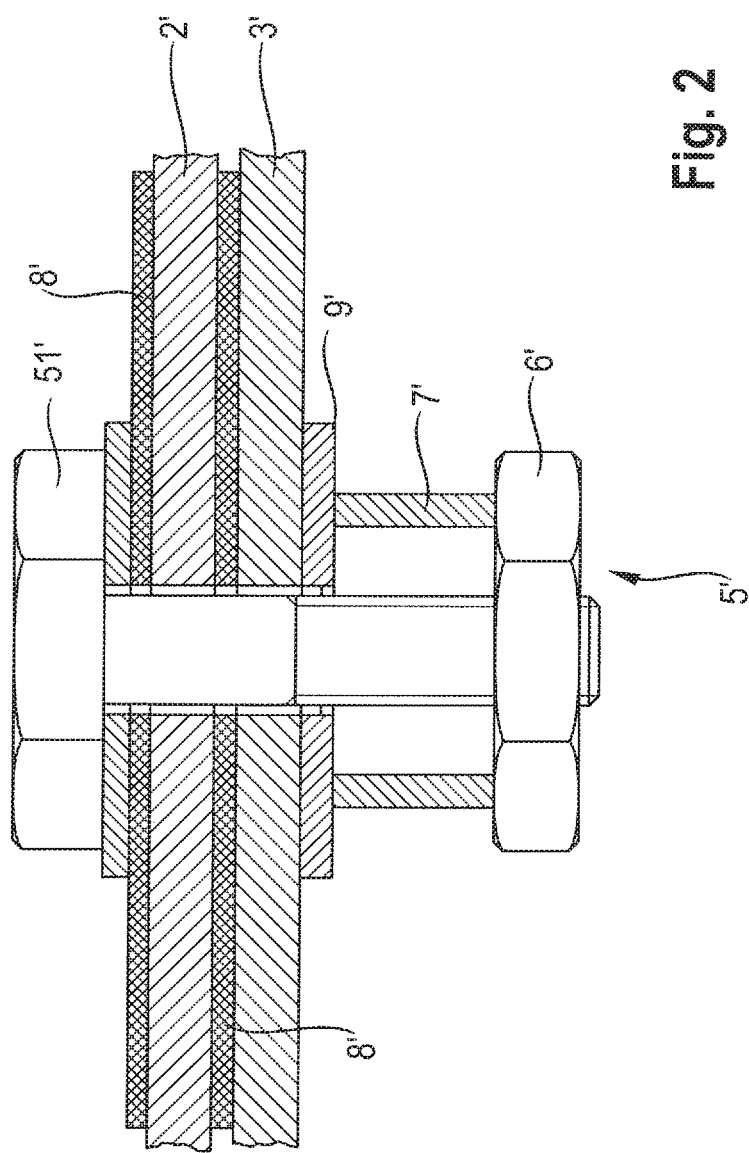

ARRANGEMENT OF A FIRST AND A SECOND COMPONENT

CROSS REFERENCE TO RELATED APPLICATIONS

This application is a continuation of PCT International Application No. PCT/EP2016/050757, filed Jan. 15, 2016, which claims priority under 35 U.S.C. § 119 from German Patent Application No. 10 2015 202 036.3, filed Feb. 5, 2015, the entire disclosures of which are herein expressly incorporated by reference.

BACKGROUND AND SUMMARY OF THE INVENTION

The invention relates to an arrangement of a first and a second component, at least one of which is a fiber-reinforced plastic component (hereinafter referred to as FRP component).

FRP components are generally known in the prior art and are increasingly used in the automotive industry for realizing lightweight constructions.

If, during the assembly process, it is the intention for such FRP components to be assembled via a bolted connection, measures are necessary for ensuring a permanently reliable bolted connection. The reason for this is that the fiber-reinforced plastic exhibits significant creep behavior, as a result of which the bolted connection can lose its preload force (so-called settling).

In order that such creep behavior of the fiber-reinforced plastic does not result in a release or loosening of the bolted connection, it is, for example, the case in the prior art that metal bushings for the lead through of the corresponding bolts are adhesively bonded into the FRP component at intended locations for the assembly process.

The principle of such a metal bushing which is adhesively bonded in is that the preload force of the bolted connection acts on the metal bushing, and the transmission of force to the FRP component is performed by the adhesive that fastens the bushing.

The use and adhesive bonding of the discussed metal bushings however leads to undesired additional weight of the FRP component and to an increase in the number of required production or assembly steps. For example, before the adhesive bonding of the metal bushing, the surface of the FRP component must be cleaned, the adhesive must subsequently be applied, and it is necessary to wait until the adhesive has cured.

Furthermore, in the case of a faulty adhesive connection, losses in stiffness may occur, which can lead to stability problems.

Thus, it is an object of the present invention to realize an arrangement of fixedly clamped components, of which at least one is an FRP component, which ensures a secure clamping connection.

This and other objects are achieved by means of an arrangement according to embodiments of the invention.

According to one aspect of the invention, an arrangement includes a first component and a second component, wherein at least the first or the second component is a fiber-reinforced plastic component. The arrangement according to the invention is in particular an arrangement of two corresponding components arranged in/on a motor vehicle or on a motorcycle.

The fiber-reinforced plastic component is formed in particular by virtue of a reinforcement fiber being embedded into a plastic matrix. The plastic matrix material that forms the matrix of the FRP component may for example be a thermoset or a thermoplastic.

Depending on the intended use of the FRP component, various types of reinforcement fibers can be used, for example inorganic reinforcement fibers (basalt, boron, glass, ceramic and silica fibers), metallic reinforcement fibers (steel, aluminum, copper, general metal and metal alloy fibers), organic reinforcement fibers (aramid, carbon, polyester, nylon, polyethylene and plexiglass fibers) and natural fibers (wood and flax fibers).

In the FRP component, the embedded reinforcement fibers may be present in different lengths, whereby different stiffness and strength characteristics can be realized. In the case of endless fibers being used, that is to say reinforcement fibers which run all the way through the FRP component, the greatest stiffness or strength values are achieved.

The abovementioned reinforcement fibers may have different structures within the component. The endless fibers may, for example, be woven to form woven fabrics, or may be present in the form of laid scrims, in which the endless fibers are arranged parallel. Other types of reinforcement fiber structures are, for example, knitted fabrics, braided fabrics, mats and nonwoven fabrics.

The first and second components are, for the generation of a clamping connection of the components, connected to each other via an expansion bolt which acts preferably directly on the plastic matrix. The expansion bolt generates a clamping force which effects the clamping connection and which acts preferably directly on the plastic matrix. The expansion bolt compensates a creep behavior of the fiber-reinforced plastic component.

Through the use of an expansion bolt, it is realized according to the invention that the creep behavior of the FRP component is compensated, because the expansion bolt behaves in the manner of a soft tensile spring. An expansion bolt of such a type has a shank which is slimmer than its thread and which in particular has elastic characteristics such that the creep behavior of the plastic matrix material that forms the plastic matrix of the FRP component is compensated.

The expansion bolt is dimensioned correspondingly in a manner dependent on which section of the motor vehicle the first component and the second component belong to.

It is preferably provided that the expansion bolt is, for the clamping of the first and second component, led through corresponding passages in the components and is, for the generation of the clamping connection of the components, equipped on one side with a nut.

The expansion bolt may be led through an additional expansion sleeve which, additionally to the expansion bolt, compensates the creep behavior of the fiber-reinforced plastic component, and which permits a minimum length of the expansion bolt in particular in the case of thin components.

The expansion sleeve that is used may for example be one with or without a flange ring.

For example, an expansion sleeve may be arranged on each side of the arrangement. As an alternative to this, it is also possible for an expansion sleeve to be arranged only on one side of the arrangement.

The expansion sleeve that is used is preferably formed from metal, and is dimensioned in a manner dependent on the forces that are intended to act during the service life of the arrangement.

The expansion sleeve that is used or the expansion sleeves that are used are designed, additionally to the expansion bolt, such that their elastic behavior is compensated for by the creep behavior of the fiber-reinforced plastic component caused by the bolted connection.

In order that the expansion sleeve has its corresponding elastic behavior, it may for example be slotted, in particular in an axial direction of the expansion bolt.

Preferred materials of the expansion sleeve are for example metals, such as titanium, corresponding metal alloys or thick-walled, creep-resistant plastics.

The same applies for the materials of the expansion bolt.

The nut which is used, which serves for producing the bolted connection and for generating the clamping force required for the clamping connection, is for example a nut which has a concave rest surface, which lies on the corresponding component.

The nut may likewise preferably be produced from a metal, a metal alloy or a creep-resistant plastic. The expansion sleeve is for example arranged between the nut and the component part situated on the side of the nut.

Alternatively, the expansion sleeve is arranged between a bolt head of the expansion bolt and the component part situated on a side of the bolt head.

The arrangement according to the invention is preferable if the first and second components are a fiber-reinforced plastic component. In this case, the first component and the second component preferably comprise a corrosion prevention layer which is arranged on a side averted from the respective other component and against which a bolt head of the expansion bolt, a nut fastened to the expansion bolt or the expansion sleeve bears.

Finally, it is preferable for the first component to be a fiber-reinforced plastic component and for the second component to be a metal component. In this case, the first component preferably comprises a corrosion prevention layer which is arranged on a surface facing toward the second component, and a corrosion prevention layer which is arranged on a side averted from the second component. A bolt head of the expansion bolt, a nut fastened to the expansion bolt or the expansion sleeve bears in particular against the corresponding corrosion prevention layer.

The corrosion prevention layers discussed above are particularly preferably used if the fiber-reinforced plastic component is produced or formed from a carbon-fiber-reinforced plastic. In this case, the corrosion prevention layers galvanically separate those surfaces of the expansion bolt, of the expansion sleeve or of the nut which bear against the component from the component. The same applies if one of the two components is a metal component and an additional corrosion prevention layer is arranged between the two components.

Corrosion, which leads to damage to the bolted connection, is advantageously prevented by means of such additional corrosion prevention layers.

Altogether, by means of the arrangement according to the invention, a secure and permanent clamping connection is realized, wherein no additional elements integrated into the FRP component, such as metal bushings, are required. The arrangement according to the invention thus also realizes a weight reduction, a smaller structural space requirement and a simple assembly process with few process steps.

Below, preferred variants of the arrangement according to the invention will be discussed with reference to the appended drawings.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1A and 1B are views of a first variant of the arrangement according to the invention, in which a first fiber-reinforced plastic component and a second fiber-reinforced plastic component are fastened to each other via an expansion bolted connection, wherein an additional expansion sleeve is arranged between either a bolt head of the expansion bolt, or a nut fastened to the expansion bolt, and the corresponding component; and FIG. 2 is a view of a second preferred variant of the arrangement according to the invention, in which a first component is a fiber-reinforced plastic component and a second component is a metal component, wherein the components are fastened to each other via an expansion bolted connection.

DETAILED DESCRIPTION OF THE DRAWINGS

FIGS. 1A and 1B show a first variant of an arrangement according to the invention, wherein a first component 2 and a second component 3 are fastened to each other via a clamping connection.

In this variant, the first component 2 and the second component 3 are preferably in each case a fiber-reinforced plastic component, in which a reinforcement fiber is embedded into a plastic matrix, for example a thermoplastic or thermosetting plastic matrix.

In each of the components 2, 3, there is formed a passage opening 4 through which an expansion bolt 5 is led. The clamping connection of the components 2, 3 is generated via the expansion bolt 5, wherein, for this purpose, the expansion bolt 5 led through the components 2, 3 is equipped, on a side facing toward the component 3, with a nut 6.

The nut 6 is fastened to a corresponding thread of the expansion bolt 5, wherein an additional expansion sleeve 7 is also arranged between the component 3 and the nut 6. Accordingly, the clamping connection is generated by use of a force fit between an expansion bolt head 51, which bears against the component 2, of the expansion bolt 5 and the nut 6, which bears against the component 3 via the expansion sleeve 7.

In particular, the plastic matrix material, which forms the plastic matrix, of the fiber-reinforced plastic components 2, 3 exhibits a creep behavior over the service life of the arrangement. This creep behavior can lead to settling of the bolted connection. To counteract such settling or a loss, caused by the creep behavior, of the clamping force effected by the clamping connection, the bolted connection is, according to the invention, realized via the expansion bolt 5 and via the additional expansion sleeve 7, which is arranged between the nut 6 and the component 3. Both the expansion bolt 5 and the expansion sleeve 7 exhibit elastic behavior such that the creep behavior of the fiber-reinforced plastic component is compensated and a release of the clamping connection is prevented.

The clamping connection realized via the expansion bolt 5 and expansion sleeve 7 makes it possible for the components 2, 3 to be directly fixedly clamped to each other without the need to use additional sleeves integrated into the components 2, 3.

FIG. 1B shows an alternative arrangement of the expansion sleeve 7. In the situation shown in FIG. 1B, the expansion sleeve 7 is arranged between a bolt head 51 of the expansion bolt 5 and the component 2 facing toward the bolt head 51.

If the reinforcement fibers of the fiber-reinforced plastic components 2, 3 are formed from a carbon fiber, it is particularly preferable for a corrosion prevention layer 8 to be provided in each case on that side of the component 2 which faces toward the bolt head 51 and on a side, facing toward the expansion sleeve 7 or the nut 6, of the component 3.

The corrosion prevention layers 8 ensure galvanic separation between the expansion bolt 5, the expansion sleeve 7 or the nut 6 and the respective component 2, 3. This in particular counteracts corrosion, which is damaging to the clamping connection, of the expansion bolt 5, of the expansion sleeve 7 or of the nut 6.

The corrosion prevention layer is preferably a glass fiber layer which is jointly integrated into the plastic matrix during the production of the corresponding fiber-reinforced plastic component 2, 3.

FIG. 2 shows a second variant of the arrangement according to the invention.

This variant differs from the variant shown in FIG. 1A merely in that the second component 3' is produced not from a fiber-reinforced plastic but from a metal, for example aluminum.

In this preferred variant of the arrangement according to the invention, it is the case in particular that a corrosion prevention layer 8' is arranged between the components 2', 3' and not on a side, facing toward the expansion sleeve 7' or the nut 6', of the component 3'.

In all of the abovementioned preferred variants of the arrangement according to the invention, it is also possible for a shim washer 9, 9' to be arranged between the bolt head 51, 51' and the corresponding component or between the expansion sleeve 7, 7' and the corresponding component or between the nut 6, 6' and the corresponding component.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement of a first component and a second component, wherein
   at least the first or the second component is a fiber-reinforced plastic component, and
   the first and second components are connected to each other, in order to generate a clamping connection of the components, via an expansion bolt,
   where the expansion bolt generates a clamping force which effects the clamping connection,
   where the expansion bolt has a first elastic behavior that compensates a creep behavior of the fiber-reinforced plastic component, wherein the creep behavior causes a loss of the clamping connection of the components, wherein the expansion bolt behaves in a manner of a tensile spring to counteract the loss of the clamping connection of the components caused by the creep behavior, and wherein the expansion bolt has a shank which is slimmer than a thread of the expansion bolt and which has the first elastic behavior that compensates the creep behavior of the fiber-reinforced plastic component, and
   where the expansion bolt is led through an expansion sleeve, wherein the expansion sleeve is slotted in an axial direction of the expansion bolt such that the expansion sleeve has a second elastic behavior that compensates the creep behavior of the fiber-reinforced plastic component.

2. The arrangement according to claim 1, wherein
   the expansion bolt is, for clamping of the first and second components, led through corresponding passages in the components and is, for the generation of the clamping connection of the components, equipped on one side with a nut.

3. The arrangement according to claim 2, wherein
   the expansion sleeve is arranged between the nut and the component situated on a side of the nut.

4. The arrangement according to claim 3, wherein
   the first and second components are fiber-reinforced plastic components, and
   the first and second components have a corrosion prevention layer which is arranged on a side averted from the respective other component and against which a bolt head of the expansion bolt, a nut fastened to the expansion bolt, or the expansion sleeve bears.

5. The arrangement according to claim 3, wherein
   the first component is a fiber-reinforced plastic component and the second component is a metal component, and
   the first component has a corrosion prevention layer which is arranged on a surface facing toward the second component, and a corrosion prevention layer which is arranged on a side averted from the second component and against which a bolt head of the expansion bolt, a nut fastened to the expansion bolt, or the expansion sleeve bears.

6. The arrangement according to claim 2, wherein
   the expansion sleeve is arranged between a bolt head of the expansion bolt and the component situated on a side of the bolt head.

7. The arrangement according to claim 6, wherein
   the first and second components are fiber-reinforced plastic components, and
   the first and second components have a corrosion prevention layer which is arranged on a side averted from the respective other component and against which a bolt head of the expansion bolt, a nut fastened to the expansion bolt, or the expansion sleeve bears.

8. The arrangement according to claim 6, wherein
   the first component is a fiber-reinforced plastic component and the second component is a metal component, and
   the first component has a corrosion prevention layer which is arranged on a surface facing toward the second component, and a corrosion prevention layer which is arranged on a side averted from the second component and against which a bolt head of the expansion bolt, a nut fastened to the expansion bolt, or the expansion sleeve bears.

9. The arrangement according to claim 2, wherein
   the first and second components are fiber-reinforced plastic components, and
   the first and second components have a corrosion prevention layer which is arranged on a side averted from the respective other component and against which a bolt head of the expansion bolt, a nut fastened to the expansion bolt, or the expansion sleeve bears.

10. The arrangement according to claim 2, wherein
    the first component is a fiber-reinforced plastic component and the second component is a metal component, and the first component has a corrosion prevention layer which is arranged on a surface facing toward the second component, and a corrosion prevention layer which is arranged on a side averted from the second component and against which a bolt head of the expansion bolt, a nut fastened to the expansion bolt, or the expansion sleeve bears.

11. The arrangement according to claim 1, wherein
the first component is a fiber-reinforced plastic component and the second component is a metal component, and
the first component has a corrosion prevention layer which is arranged on a surface facing toward the second component, and a corrosion prevention layer which is arranged on a side averted from the second component and against which a bolt head of the expansion bolt, a nut fastened to the expansion bolt, or the expansion sleeve bears.

\* \* \* \* \*